(12) United States Patent
Slaney et al.

(10) Patent No.: US 10,815,932 B2
(45) Date of Patent: Oct. 27, 2020

(54) CONVERGENT-DIVERGENT NOZZLE MECHANISM

(71) Applicant: United Technologies Corporation, Farmington, CT (US)

(72) Inventors: Brandon T. Slaney, West Hartford, CT (US); Andrew S. Miller, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 239 days.

(21) Appl. No.: 15/978,939

(22) Filed: May 14, 2018

(65) Prior Publication Data

US 2019/0345894 A1   Nov. 14, 2019

(51) Int. Cl.
*F02K 1/12* (2006.01)
*F01D 9/04* (2006.01)
*F01D 17/14* (2006.01)

(52) U.S. Cl.
CPC .............. *F02K 1/1223* (2013.01); *F01D 9/04* (2013.01); *F01D 17/14* (2013.01); *F05D 2240/128* (2013.01); *F05D 2250/323* (2013.01); *F05D 2250/324* (2013.01)

(58) Field of Classification Search
CPC ........ F02K 1/12; F02K 1/1223; F02K 1/1292; F02K 1/80; F05D 2240/128; H02K 7/08; F01D 25/16; F01D 25/162; Y10T 403/32861; Y10T 403/32893; Y10T 403/32909; Y10T 403/32918; F16C 11/045

USPC .................................. 403/150, 154, 156, 157
See application file for complete search history.

(56) References Cited

U.S. PATENT DOCUMENTS

| | | | | |
|---|---|---|---|---|
| 2,596,202 | A | * 5/1952 | Bolte | F16C 11/0614 384/212 |
| 3,822,100 | A | * 7/1974 | Reinsma | F16C 11/0614 403/134 |
| 3,977,740 | A | 8/1976 | Struttmann | |
| 3,989,126 | A | * 11/1976 | Katzer | B61H 5/00 188/206 R |
| 4,141,501 | A | 2/1979 | Nightingale | |
| 4,607,977 | A | * 8/1986 | Varnelis | F16C 11/045 403/154 |
| 4,784,326 | A | 11/1988 | Honeycutt, Jr. | |
| 5,102,050 | A | 4/1992 | Sedziol | |
| 5,351,888 | A | 10/1994 | Taylor et al. | |
| 6,299,077 | B1 | 10/2001 | Harmon et al. | |
| 7,533,533 | B2 | 5/2009 | Bainachi et al. | |
| 8,020,386 | B2 | 9/2011 | Cowan et al. | |
| 9,840,984 | B2 | 12/2017 | Schirtzinger | |

(Continued)

OTHER PUBLICATIONS

EP search report for EP19162551.6 dated Sep. 20, 2019.

*Primary Examiner* — Steven M Sutherland
(74) *Attorney, Agent, or Firm* — Getz Balich LLC (57) ABSTRACT

A convergent flap roller assembly is provided that includes a first hanger flange, a second hanger flange, a roller, and a pivot axle. Each hanger flange has a panel, a roller shaft, and at least one track tab. Each roller shaft extends outwardly from the respective panel, and includes a roller shaft bore. The roller has a center bore and an exterior contact surface. The roller shafts are received within the roller center bore and are in contact with each other, and the pivot axle extends through the roller shaft bores.

13 Claims, 4 Drawing Sheets

(56) References Cited

U.S. PATENT DOCUMENTS

2009/0190874 A1 7/2009 Burner
2016/0102574 A1 4/2016 Peters
2016/0333725 A1 11/2016 Peters et al.

* cited by examiner

CONVERGENT-DIVERGENT NOZZLE MECHANISM

This invention was made with Government support under Contract Number FA8626-16-C-2139 awarded by the United States Air Force. The Government has certain rights in this invention.

BACKGROUND

The present invention relates generally to convergent-divergent nozzles used in gas turbine engines, and in particular to mechanisms for actuating nozzle flaps within a convergent-divergent nozzle.

Gas turbine engine exit nozzles are commonly employed to produce additional thrust for the engine by accelerating the working medium gas (e.g., air, combustion products, etc.) leaving the aft end of the main engine through the nozzle. Exit nozzles accelerate the air leaving the engine, and therefore produce useful thrust, by prescribing the nozzle area for particular exit pressures inside the nozzle. An example of an exit nozzle is a variable convergent-divergent exit nozzle. Variable convergent-divergent nozzles commonly include convergent portion and a divergent portion, each arranged circumferentially about the main axis of the engine to form a substantially circular annular nozzle extending aft of the low pressure turbine. The flaps that form the convergent portion are commonly connected to an annular ring, which ring is sometimes referred to as a sync ring. Each convergent flap has a forward end and an aft end. Each of the divergent flaps that collectively form the divergent portion of the nozzle also includes a forward end and an aft end. In most convergent-divergent nozzles, the aft end of each convergent flap is pivotally connected to the forward end of a corresponding divergent flap. The circumferentially arranged convergent-divergent portions form an annular nozzle whose cross-sectional area decreases from the forward end of the nozzle to a throat generally defined by the pivotal connection between the convergent and divergent flaps and then increases in cross-sectional area from the throat to the nozzle exit. Actuators in communication with the sync ring are operable to selectively translate the sync ring. Translation of the sync ring, in turn causes movement of the convergent portion and attached divergent portion; e.g., the convergent and divergent portions of the nozzle are moved so that the cross-sectional area of the nozzle throat is increased or decreased.

Variable convergent-divergent nozzles are configured so that the engine control system may adjust the cross-sectional area of the nozzle to optimize engine performance for different operating conditions. The positions of the convergent and divergent portions, and thereby the annular shape of the nozzle may be described in terms of the ratio of the cross-sectional area of the nozzle at the nozzle exit ($A_E$) divided by the cross-sectional area of the nozzle at the throat ($A_T$), or $A_E/A_T$. The nozzle pressure ratio (NPR) is equal to the total pressure at the nozzle throat ($P_T$) divided by the ambient pressure ($P_{Amb}$), or $NPR=P_T/P_{Amb}$. Convergent-divergent nozzles function generally by assigning $A_E/A_T$ for critical flight conditions (e.g., NPR) in order to produce useful thrust by extracting as much energy as is practicable from the gas stream exiting through the nozzle.

The movement of the convergent and divergent portions of convergent-divergent nozzles to selectively vary the cross-sectional area of the nozzle throat and or the cross-sectional area of the nozzle exit must accommodate a substantial applied load and very high temperatures. The gas stream traveling through the nozzle applies a substantial load on the respective flaps, and the structure supporting the respective flaps may be described as providing a reaction load on the respective flaps counter to the applied load. Under certain operating conditions, the load applied to the flaps can reverse. These loads applied to the flaps can make movement of the flaps problematic. For example, in some prior art configurations each convergent flap is in communication with a guide track that constrains axial and radial movement of the convergent flap. The translation of the sync ring causes the convergent flaps to translate along and be guided by the respective guide tracks. In some prior art embodiments, each convergent flap is engaged to slide along a guide track during the translation, and therefore is subject to frictional forces resisting the sliding movement. The substantial load applied to the flap can create a significant frictional force that resists the sliding movement, thereby necessitating larger, stronger, and typically heavier linkages and actuators. Under some circumstances, convergent flaps and respective guide tracks can be misaligned during some or all of the translational movement of the flaps. The misalignment can cause binding that can further impede translational movement of the flap.

What is needed is a convergent-divergent nozzle configuration that can be readily operated, one that can accommodate significant applied loads, and one that can accommodate an environment of substantially elevated temperatures.

SUMMARY

According to an aspect of the present disclosure a convergent flap roller assembly is provided. The roller assembly includes a first hanger flange, a second hanger flange, a roller, and a pivot axle. The first hanger flange has a first panel, a first roller shaft, and at least one first track tab. The first roller shaft extends outwardly from the first panel, and includes a first roller shaft bore. The second hanger flange has a second panel, a second roller shaft, and at least one second track tab. The second roller shaft extends outwardly from the second panel, and includes a second roller shaft bore. The roller has a center bore and an exterior contact surface. The first roller shaft and the second roller shaft are received within the roller center bore and are in contact with each other, and the pivot axle extends through the first roller shaft bore and the second roller shaft bore.

According to another aspect of the present disclosure, a convergent-divergent nozzle is provided that includes a plurality of divergent flaps and a plurality of convergent flaps. The plurality of divergent flaps each have a forward end and an aft end. The plurality of convergent flaps each have a forward end, an aft end, and at least one support flange. Each respective convergent flap is pivotally attached to a respective one of the plurality of divergent flaps. A roller assembly engages each convergent flap with a guide track. Each roller assembly includes a first hanger flange, a second hanger flange, a roller, and a pivot axle. The first hanger flange has a first panel, a first roller shaft, and at least one first track tab. The first roller shaft extends outwardly from the first panel, and includes a first roller shaft bore. The second hanger flange has a second panel, a second roller shaft, and at least one second track tab. The second roller shaft extends outwardly from the second panel, and includes a second roller shaft bore. The roller has a center bore and an exterior contact surface. The first roller shaft and the second roller shaft are received within the roller center bore and are in contact with each other, and the pivot axle extends through the first roller shaft bore and the second roller shaft bore.

According to another aspect of the present disclosure, a gas turbine engine is provided that includes a convergent-divergent nozzle as described above.

In any of the aspects or embodiments described above and herein, the first panel may include a first inner surface and an opposing first outer surface, and the first roller shaft may extend outwardly from the first inner surface, and the at least one first track tab may extend outwardly from the first outer surface, and the second panel may include a second inner surface and an opposing second outer surface, and the second roller shaft may extend outwardly from the second inner surface, and the at least one second track tab may extend outwardly from the second outer surface.

In any of the aspects or embodiments described above and herein, the at least one first track tab may extend outwardly from the first outer surface adjacent a distal end of the first panel, and the at least one second track tab may extend outwardly from the second outer surface adjacent a distal end of the second panel.

In any of the aspects or embodiments described above and herein, the first panel may include a first inner surface and an opposing first outer surface, and the first roller shaft may extend outwardly from the first inner surface, and the at least one first track tab may extend outwardly from the first inner surface, and the second panel may include a second inner surface and an opposing second outer surface, and the second roller shaft may extend outwardly from the second inner surface, and the at least one second track tab may extend outwardly from the second inner surface.

In any of the aspects or embodiments described above and herein, the at least one first track tab may extend outwardly from the first inner surface adjacent a distal end of the first panel, and the at least one second track tab may extend outwardly from the second inner surface adjacent a distal end of the second panel.

In any of the aspects or embodiments described above and herein, the first hanger flange and the second hanger flange are mirror images of one another.

In any of the aspects or embodiments described above and herein, the roller may be configured to accommodate misalignment.

In any of the aspects or embodiments described above and herein, the roller includes a self-lubricating bearing.

In any of the aspects or embodiments described above and herein, the at least one support flange of each convergent flap includes a first support flange and a second support flange, and the first roller shaft of the first hanger flange may extend through the first support flange, and the second roller shaft of the second hanger flange may extend through the second support flange, and the roller is disposed between the first support flange and the second support flange.

In any of the aspects or embodiments described above and herein, the first support flange may include a self-lubricating bearing engaged with the first roller shaft, and the second support flange may include a self-lubricating bearing engaged with the second roller shaft.

In any of the aspects or embodiments described above and herein, the respective track may have a C-shaped configuration and the at least one first track tab and the at least one second track tab are engaged with the respective C-shaped track to maintain an engagement between the respective roller assembly and the respective track.

In any of the aspects or embodiments described above and herein, the respective track may have an I-shaped configuration and the at least one first track tab and the at least one second track tab are engaged with the respective I-shaped track to maintain an engagement between the respective roller assembly and the respective track.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, material, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
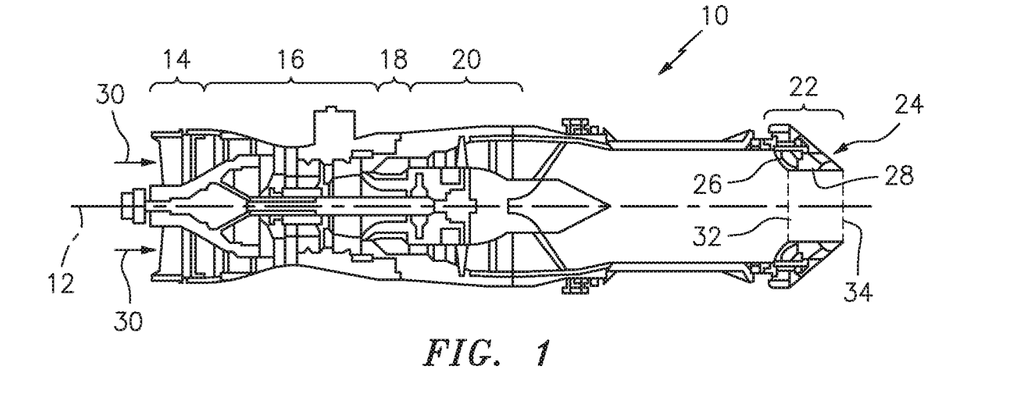
FIG. 1 is a diagrammatic partially sectioned view of a gas turbine engine.

FIG. 1 is an axial sectional diagrammatic view of a gas turbine engine 10 including a longitudinal engine axis 12, a fan section 14, a compressor section 16, a combustion section 18, a turbine section 20, and a variable convergent-divergent nozzle 22. The compressor section includes a low pressure compressor and a high pressure compressor. The turbine section typically a low pressure turbine and a high pressure turbine. A low speed spool typically connects the fan section and the low pressure compressor to the low pressure turbine. In some embodiments, the low speed spool may be connected to the fan section through a speed change mechanism (e.g., a geared architecture that drives the fan section 14 at a lower rotational speed than the low speed spool). A high speed spool connects the high pressure compressor to the high pressure turbine. The combustor section is disposed between the high pressure compressor and the high pressure turbine. The low speed spool and the high speed spools are typically concentric and rotate about the engine longitudinal axis.

During operation of engine 10, a gas stream 30 (initially comprised of air) is drawn into the front of engine 10 by rotation of fan blades disposed within the fan section 14. The fan section 14 directs a portion of the gas stream 30 into the compressor section 16. The gas stream 30 is successively compressed (e.g., elevated in temperature and pressure) through stages of the compressor section 16 and directed into the combustor section 18. In combustor section 18, the now-compressed gas stream 30 is mixed with fuel and ignited. The gas and fuel mixture ignited in the combustor section 18 is directed into the turbine section 20 in which the gas stream (now including air, combustion products, etc.) is successively expanded. The high pressure turbine extracts energy from the gas stream to power the high pressure compressor via the high speed spool. The low pressure turbine extracts energy from the gas stream to power the fan section 14 and the compressor section 16 via the low speed spool. The gas stream 30 subsequently exits the engine 10 through nozzle 22, producing useful thrust for engine 10.

The gas turbine engine 10 described above and shown in FIG. 1 is a non-limiting example of a gas turbine engine that may include aspects of the present disclosure. The present disclosure is not limited to any particular gas turbine engine embodiment that may include a convergent-divergent nozzle; e.g., a non-augmented gas turbine engine, an augmented gas turbine engine, a super-sonic capable gas turbine engine, a gas turbine engine with a geared architecture for driving the fan, etc.

Referring to FIGS. 2-5, the convergent-divergent nozzle 22 includes a convergent portion 26 and a divergent portion 28, each arranged circumferentially about the main axis 12 of the engine 10 to form the substantially annular convergent-divergent nozzle 22. Typically, a gas turbine engine 10 will include a synchronization ring 36 (referred to as a "sync ring 36") as part of a mechanism for actuating a convergent-divergent nozzle 22. A sync ring 36 is typically an annular structure that is in communication with the convergent flaps 38 and divergent flaps 40 via linkages. A plurality of actuators 42 (e.g., electromechanical actuators, hydraulic actuators, etc.) are in communication with the sync ring 36 and are operable to axially translate the sync ring 36 forward and aft. The translation of the sync ring 36 causes movement of the convergent and divergent flaps 38, 40.

The divergent portion 28 of the convergent-divergent nozzle 22 is formed from a plurality of flaps 40 (referred to as "divergent flaps 40") circumferentially positioned to collectively form an annular gas path surface. Each divergent flap 40 has a forward end 44 and an aft end. The forward end 44 of each divergent flap 40 is pivotally connected to the aft end 54 of a respective convergent flap 38. As will be described below, each divergent flap 40 may be in communication with linkage that supports and constrains movement of the flap 40.

Figure 3:
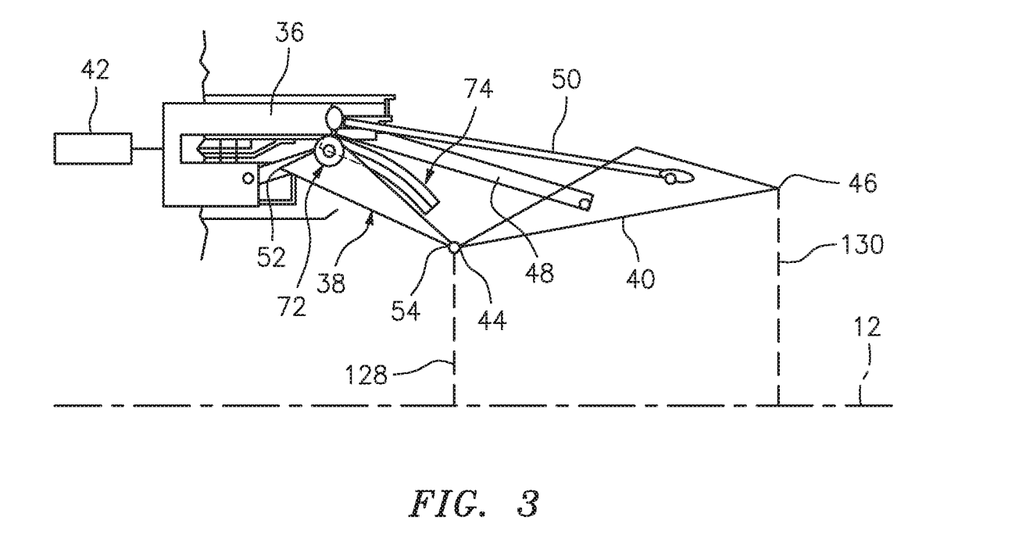
FIG. 3 is a diagrammatic partial side view of a convergent-divergent nozzle embodiment, illustrating a roller assembly engaged with a track toward the forward end of the track.
Figure 4:
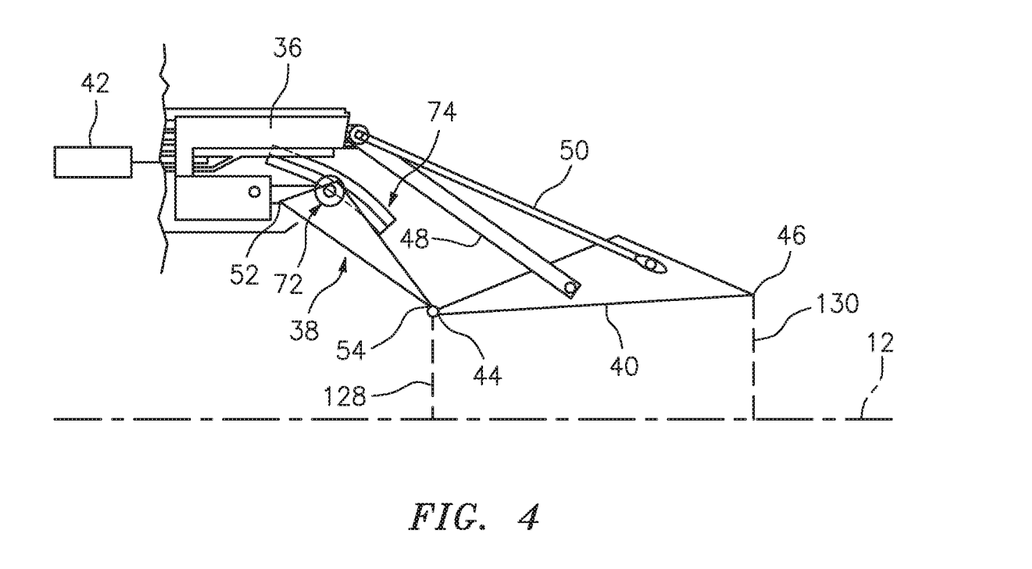
FIG. 4 is the diagrammatic partial side view of the convergent-divergent nozzle embodiment shown in FIG. 3, with the roller assembly engaged with a track toward the middle of the track.
Figure 5:
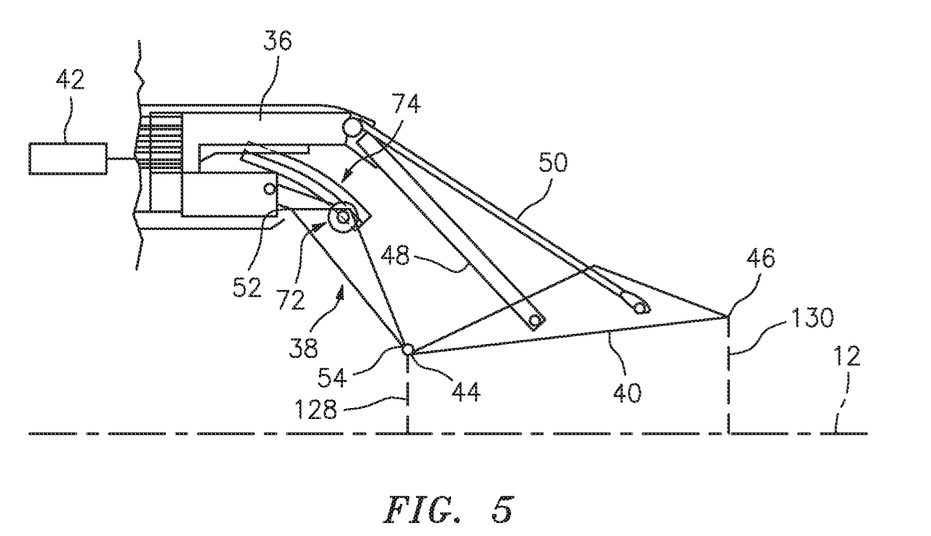
FIG. 5 is the diagrammatic partial side view of the convergent-divergent nozzle embodiment shown in FIG. 3, with the roller assembly engaged with a track toward the aft end of the track.

FIGS. 3-5 diagrammatically illustrate an exemplary linkage wherein each divergent flap 40 is connected to the sync ring 36 by a first link 48 and a second link 50. Each of these links 48, 50 is pivotally mounted to the respective divergent flap 40. The connection between the divergent flap 40 and the first link 48 establishes a pivot axis about which the divergent flap 40 can pivot. The second link 50 provides a mechanical limit to the rotational movement of the convergent flap 38 attached to the respective divergent flap 40, and the corresponding motion of the divergent flap 40. As indicated above, the flap linkage embodiment shown in FIGS. 3-5 is intended to illustrate a linkage example, and the present disclosure is not limited thereto.

Figure 2:
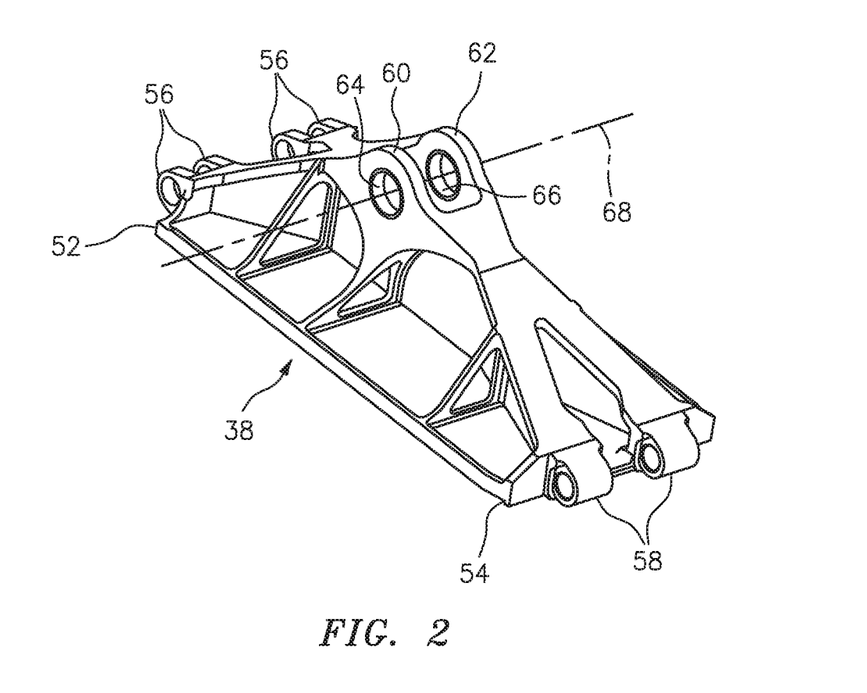
FIG. 2 is an isometric perspective view of a convergent flap embodiment.

Referring to FIG. 2, the convergent portion 26 of the convergent-divergent nozzle 22 is formed from a plurality of flaps 38 (referred to as "convergent flaps 38") circumferentially positioned to collectively form an annular gas path surface. Each convergent flap 38 has a forward end 52 and an aft end 54. The forward end 52 of each convergent flap 38 is pivotally connected (directly or indirectly) via a plurality of pivot flanges 56 to the sync ring 36. The aft end 54 of each convergent flap 38 is pivotally connected via a plurality of pivot flanges 58 to the forward end of a respective divergent flap 40.

The convergent flap 38 embodiment shown in FIG. 2 includes a first support flange 60 and a second support flange 62. The first and second support flanges 60, 62 are spaced apart from one another and generally parallel one another. A first shaft bearing 64 is mounted within a bore disposed in the first support flange 60 and a second shaft bearing 66 is mounted within a bore disposed in the second support flange 62. The first and second shaft bearings 64, 66 each have an inner bore and the inner bores are aligned with one another such that a single pivot axis 68 extends there through. In some embodiments the first and second shaft bearings 64, 66 comprise a self-lubricating material such as, but not limited to, a polytetrafluoroethylene ("PTFE") material or a curable acrylate composition. Acceptable examples of commercially available self-lubricating bearings include bearings comprising Fiberglide® or Fabroid® bearing material available from the Roller Bearing Company of America, Inc., of Oxford Conn., USA, or Vulkyn™ bearing material available from New Hampshire Ball Bearings, Inc., of Laconia, N.H., USA. The convergent flap 38 embodiment shown in FIG. 2, including the first and second support flanges 60, 62, is a non-limiting example of a convergent flap 38 and the present disclosure is not limited thereto.

The first and second shaft bearings 64, 66 are configured to receive a pivot axle 70 that permits a roller assembly 72 to be pivotally connected with the convergent flap 38. The roller assembly 72 in turn, facilitates translational movement of the convergent flap 38 along one or more a guide members. As can be seen in FIGS. 3-5, a guide member 74, sometimes referred to as a "track", is associated with each convergent flap 38. The track 74 is configured (typically curvilinear) to guide the movement and position the respective convergent flap 38, and therefore also the relative position of the attached divergent flap 40. The track 74 is typically also configured to react gas stream pressure loads transmitted via the flaps. As will be described below, the track 74 may assume a variety of different configurations, and the present disclosure is not limited to any particular track 74 configuration.

Figure 6:
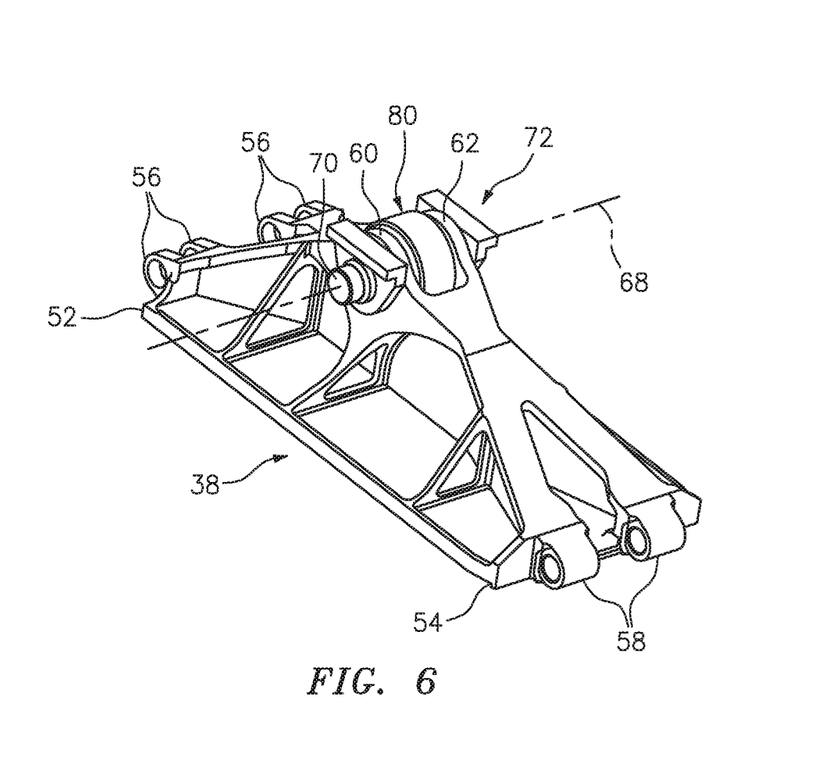
FIG. 6 is an isometric perspective view of a convergent flap embodiment, including a portion of a roller assembly embodiment.
Figure 7:
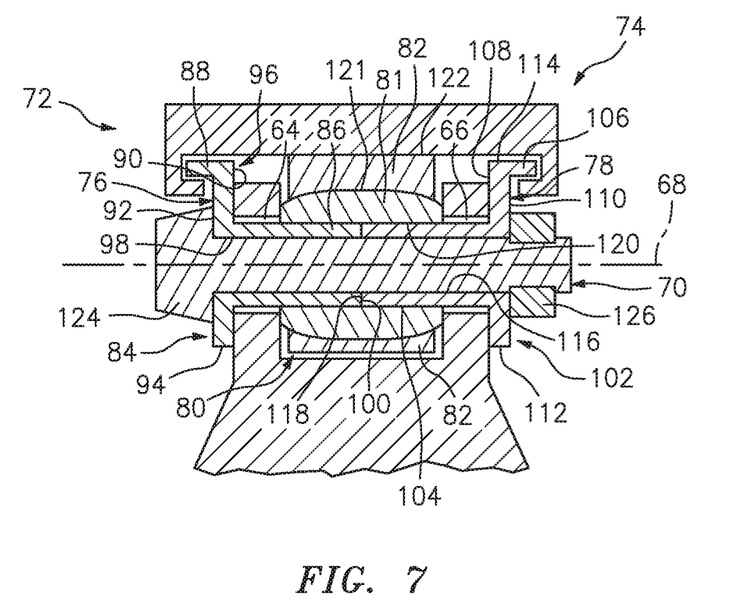
FIG. 7 is a diagrammatic sectional view of roller assembly embodiment, shown mounted on a convergent flap and a track embodiment.
Figure 8:
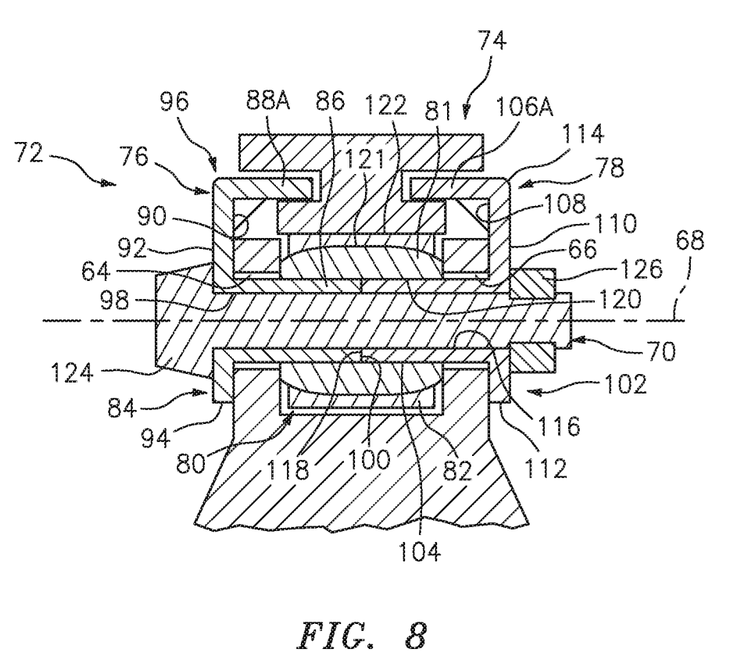
FIG. 8 is a diagrammatic sectional view of roller assembly embodiment, shown mounted on a convergent flap and a track embodiment.

Referring to FIGS. 6-8, the roller assembly 72 includes a first hanger flange 76, a second hanger flange 78, a roller 80, and a pivot axle 70. In some embodiments, the roller assembly 72 may additionally include a roller race 82. The first hanger flange 76 includes panel 84, a roller shaft 86, and a track tab 88. The panel 84 includes an inner surface 90, an opposing outer surface 92, a flap end 94, and an opposing distal end 96. The roller shaft 86 extends outwardly from the panel inner surface 90, and includes a bore 98, and a shaft end surface 100. The roller shaft bore 98 extends through the panel 84 and is open to the panel outer surface 92. The distance between the panel inner surface 90 and the shaft end surface 100 defines the length of the roller shaft 86. In the roller assembly embodiment shown in FIGS. 6 and 7, the track tab 88 extends outwardly from the panel outer surface 92 adjacent the distal end 96 of the first hanger flange 76. In the roller assembly embodiment shown in FIG. 8, the track tab 88A extends inwardly from the panel inner surface 90 adjacent the distal end 96 of the first hanger flange 76.

The second hanger flange 78 includes a panel 102, a roller shaft 104, and a track tab 106. The panel 102 includes an inner surface 108, an opposing outer surface 110, a flap end 112, and an opposing distal end 114. The roller shaft 104 extends outwardly from the panel inner surface 108, and includes a bore 116, and a shaft end surface 118. The roller shaft bore 116 extends through the panel 102 and is open to the panel outer surface 110. The distance between the panel inner surface 108 and the shaft end surface 118 defines the length of the roller shaft 104. In the roller assembly embodiment shown in FIGS. 6 and 7, the track tab 106 extends outwardly from the panel outer surface 110 adjacent the distal end 114 of the second hanger flange 78. In the roller assembly embodiment shown in FIG. 8, the track tab 106A extends inwardly from the panel inner surface 108 adjacent the distal end 114 of the second hanger flange 78.

The position of the track tabs 88, 106, 88A, 106A of the first and second hanger flanges 76, 78 adjacent the distal end 96, 114 of the panel 84, 102 of the respective hanger flange 76, 78 facilitates some degree of relative rotation between the convergent flap 38 and the roller assembly 72. The relative rotation between the convergent flap 38 and the roller assembly 72 prevents binding of the roller assembly 72 as the roller assembly 72 translates relative to the respective track 74 (e.g., particularly translation along curvilinear tracks) as will be described below.

In some embodiments (e.g., the embodiments shown in FIGS. 6-8), the first and second hanger flanges 76, 78 are mirror images of one another; e.g., right hand and left hand versions. The present disclosure is not limited to first and second hanger flanges 76, 78 that are mirror images of one another.

The roller 80 has a center bore 120 having a rotational axis and has an exterior contact surface 122. In FIGS. 7 and 8 the rotational axis of the roller is shown coincidental with the pivot axis 68 of the first and second shaft bearings 64, 66. The center bore 120 is sized to permit the hanger flange roller shafts 86, 104 to be received within the center bore 120 with a slide fit. The roller may be configured to accommodate some amount of misalignment between the exterior contact surface 122 of the roller 80 and the rotational axis of the roller 80. For example, as shown in FIGS. 7 and 8, the roller 80 may be spherical roller bearing that includes a ball element 81 and a race element 82. The race element 82 may rotate relative to the ball element 81 and relative to the track 74. Similarly, the ball element 81 may rotate relative to the race element 82 and relative to the roller shafts 86, 104. In those embodiments wherein the roller 80 is a spherical roller bearing, the roller bearing may include a liner or coating disposed between the ball element 81 and the race element 82 (e.g., a Fiberglide®, or Fabroid®, or a Vulkyn™ bearing material as describe above that gives the spherical roller bearing a self-lubricating characteristic); e.g., at the contact interface 121 between the ball element 81 and the race element 82. Non-limiting examples of acceptable roller material include A286 alloy (i.e., a iron-nickel-chromium alloy with additions of molybdenum and titanium), Inconel alloys, stainless steel, cobalt alloys, nickel alloys, etc.

In assembled form, the first shaft bearing 64 is mounted within the first support flange 60 and the second shaft bearing 66 is mounted within the second support flange 62. The roller 80 is disposed between the first and second support flanges 60, 62 of the convergent flap 38. The roller shaft 86 of the first hanger flange 76 is received within the first shaft bearing 64 and extends into the bore 120 of the roller 80. The roller shaft 104 of the second hanger flange 78 is received within the second shaft bearing 66 and extends into the bore 120 of the roller 80. When the shaft end surfaces 100, 118 of the roller shafts 86, 104 are in contact one another, the combined lengths of the bearing flange roller shafts 86, 104 establish proper spacing relative to the first and second support flanges 60, 62. The pivot axle 70 extends through the roller shaft bores 98, 116 of the first and second hanger flanges 76, 78. The pivot axle 70 is configured to retain the roller assembly 72 together. For example, in the embodiment shown in FIGS. 6 and 7, the pivot axle 70 includes a head 124 on a first end and the opposite second end is threaded to receive a nut 126. The present disclosure is not limited to this particular pivot axle 70 configuration.

In the roller assembly 72 embodiment shown in FIGS. 6 and 7, the track 74 has a "C-shaped" cross-sectional geometry. The track tab 88, 106 of each hanger flange 76, 78 extends outwardly and is received within the C-shaped track 74. Hence, the track tabs 88, 106 maintain engagement between the roller assembly 72 and the track 74, and the track 74 and roller assembly 72 are configured to accommodate the loadings described above. In the roller assembly 72 embodiment shown in FIG. 8, the track 74 has an "I-shaped" cross-sectional geometry. The track tab 88A, 106A of each hanger flange 76, 78 extends inwardly and is received within the I-shaped track 74. Hence, the track tabs 88A, 106A maintain engagement between the roller assembly 72 and the track 74, and the track 74 and the roller assembly 72 are configured to accommodate the loadings described above. The aforesaid C-shaped and I-shaped tracks 74 (and the mating roller assembly geometry) are non-limiting examples of how a track 74 and hanger flanges 76, 78 may be configured to establish engagement between the roller assembly 72 and the track 74. The inner and outer races 82A, 82B of the roller race facilitate relative movement between the roller 80 and the track 74.

During operation of the engine 10, the convergent-divergent nozzle 22 can be operated to selectively alter the performance of the engine 10 (e.g., alter the amount of thrust produced) by adjusting the configuration of the nozzle 22. As stated above, the convergent-divergent nozzle 22 may be described as having a throat area 128, and a nozzle exit area 130. In gas turbine engines that have a nozzle that is concentric about the engine axis 12, the throat area 128 may be described as the area of a plane disposed substantially normal to the engine axis 12 at or about the point where the convergent flaps 38 pivotally connect with the divergent flaps 40, and the nozzle exit area 130 may be described as the area of a plane disposed substantially normal to the engine axis 12 at or about the aft ends 46 of the divergent flaps 40. In a gas turbine engine that has a vectoring nozzle, the planes that define the throat area 128 and the nozzle exit area 130 may be normal to an axis that travels with the vectoring nozzle; i.e., an axis that is skewed relative to the engine axis 12. The throat area 128 and/or the nozzle area 130 can be varied by translating the sync ring 36 forward or aft.

FIGS. 3-5 are diagrammatic side views of an exemplary convergent-divergent nozzle 22, illustrating three different convergent flap 38 and divergent flap 40 positions accomplished by translating the sync ring 36 and therefore the convergent flaps 38 relative to the track 74. In FIG. 3, the roller assembly 72 connected to the convergent flap 38 is located toward a forward end of the track 74. In FIG. 4, the roller assembly 72 connected to the convergent flap 38 is located about the middle of the length of the track 74. In FIG. 5, the roller assembly 72 connected to the convergent flap 38 is located toward an aft end of the track 74.

The amount of force necessary to actuate (e.g., translate) a convergent-divergent nozzle 22 can be significant. As indicated above, prior art convergent flap 38 assemblies that utilize a guide mechanism that slides along a track can be subject to a significant frictional force that resists the aforesaid translation. The present disclosure greatly reduces the amount of force required to actuate the nozzle 22 by virtue of the described roller assemblies. Also as described above, under some circumstances convergent flaps 38 and respective guide tracks can be misaligned during some or all of the translational movement of the flaps. The misalignment can cause binding that can further impede translational movement of the flap. Embodiments of the present disclosure decrease issues associated with such misalignment by utilizing roller assemblies 72 configured to accommodate misalignment. Still further, the present disclosure roller assemblies 72 are configured to operate in high temperature environments (e.g., environments where normally lubricated bearings are ill suited), and to require relatively little maintenance.

Although the present invention has been described with reference to particular embodiments, workers skilled in the art will recognize that changes may be made in form and detail without departing from the spirit and scope of the invention.

What is claimed is:

1. A convergent flap roller assembly, comprising:
a first hanger flange having a first panel, a first roller shaft, and at least one first track tab, wherein the first roller shaft extends outwardly from the first panel, and includes a first roller shaft bore;
a second hanger flange having a second panel, a second roller shaft, and at least one second track tab, wherein the second roller shaft extends outwardly from the second panel, and includes a second roller shaft bore;
a roller having a center bore and an exterior contact surface; and
a pivot axle;
wherein the first roller shaft and the second roller shaft are received within the roller center bore and are in contact with each other, and the pivot axle extends through the first roller shaft bore and the second roller shaft bore;
wherein the first panel includes a first inner surface and an opposing first outer surface, and the first roller shaft extends outwardly from the first inner surface, and the at least one first track tab extends outwardly from the first inner surface; and
wherein the second panel includes a second inner surface and an opposing second outer surface, and the second roller shaft extends outwardly from the second inner surface, and the at least one second track tab extends outwardly from the second inner surface.

2. The convergent flap roller assembly of claim 1, wherein the at least one first track tab extends outwardly from the first inner surface adjacent a distal end of the first panel, and the at least one second track tab extends outwardly from the second inner surface adjacent a distal end of the second panel.

3. The convergent flap roller assembly of claim 1, wherein the roller is configured to accommodate misalignment.

4. The convergent flap roller assembly of claim 3, wherein the roller is a spherical roller bearing.

5. The convergent flap roller assembly of claim 1, wherein the spherical roller bearing is a self-lubricating bearing.

6. A convergent-divergent nozzle, comprising:
a plurality of divergent flaps, each with a forward end and an aft end;
a plurality of convergent flaps, each with a forward end, an aft end, and at least one support flange, wherein each respective convergent flap is pivotally attached to a respective one of the plurality of divergent flaps;
wherein a roller assembly engages each convergent flap with a guide track, and each roller assembly includes:
a first hanger flange having a first panel, a first roller shaft, and at least one first track tab, wherein the first roller shaft extends outwardly from the first panel, and includes a first roller shaft bore;
a second hanger flange having a second panel, a second roller shaft, and at least one second track tab, wherein the second roller shaft extends outwardly from the second panel, and includes a second roller shaft bore;
a roller having a center bore and an exterior contact surface; and
a pivot axle;
wherein the first roller shaft and the second roller shaft are received within the roller center bore and are in contact with each other, and the pivot axle extends through the first roller shaft bore and the second roller shaft bore;
wherein the at least one support flange of each convergent flap includes a first support flange and a second support flange;
wherein the first roller shaft of the first hanger flange extends through the first support flange, and the second roller shaft of the second hanger flange extends through the second support flange; and
wherein the roller is disposed between the first support flange and the second support flange.

7. The convergent-divergent nozzle of claim 6, wherein the first support flange includes a self-lubricating bearing engaged with the first roller shaft, and the second support flange includes a self-lubricating bearing engaged with the second roller shaft.

8. The convergent-divergent nozzle of claim 6, wherein the first panel includes a first inner surface and an opposing first outer surface, and the first roller shaft extends outwardly from the first inner surface, and the at least one first track tab extends outwardly from the first outer surface; and
wherein the second panel includes a second inner surface and an opposing second outer surface, and the second roller shaft extends outwardly from the second inner surface, and the at least one second track tab extends outwardly from the second outer surface.

9. The convergent-divergent nozzle of claim 8, wherein the at least one first track tab extends outwardly from the first outer surface adjacent a distal end of the first panel, and the at least one second track tab extends outwardly from the second outer surface adjacent a distal end of the second panel; and
wherein the respective track has a C-shaped configuration and the at least one first track tab and the at least one second track tab are engaged with the respective C-shaped track to maintain an engagement between the respective roller assembly and the respective track.

10. The convergent-divergent nozzle of claim 6, wherein the first panel includes a first inner surface and an opposing first outer surface, and the first roller shaft extends outwardly from the first inner surface, and the at least one first track tab extends outwardly from the first inner surface; and wherein the second panel includes a second inner surface and an opposing second outer surface, and the second roller shaft extends outwardly from the second inner surface, and the at least one second track tab extends outwardly from the second inner surface.

11. The convergent-divergent nozzle of claim 10, wherein the at least one first track tab extends outwardly from the first inner surface adjacent a distal end of the first panel, and the at least one second track tab extends outwardly from the second inner surface adjacent a distal end of the second panel; and wherein the respective track has an I-shaped configuration and the at least one first track tab and the at least one second track tab are engaged with the respective I-shaped track to maintain an engagement between the respective roller assembly and the respective track.

12. The convergent-divergent nozzle of claim 11, wherein the roller is configured to accommodate misalignment.

13. The convergent-divergent nozzle of claim 6, wherein the roller is a spherical roller bearing.

* * * * *